(12) United States Patent
Olczak et al.

(10) Patent No.: US 7,813,045 B2
(45) Date of Patent: Oct. 12, 2010

(54) PRISM PITCH OPTIMIZATION

(75) Inventors: Eugene Olczak, Pittsford, NY (US); Dennis J. Coyle, Clifton Park, NY (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 439 days.

(21) Appl. No.: 11/979,153

(22) Filed: Oct. 31, 2007

(65) Prior Publication Data

US 2008/0117507 A1 May 22, 2008

Related U.S. Application Data

(63) Continuation-in-part of application No. 11/445,210, filed on Jun. 2, 2006, now abandoned.

(51) Int. Cl.
*G02B 27/10* (2006.01)
(52) U.S. Cl. ........................... 359/621; 359/619
(58) Field of Classification Search ................ 359/621
See application file for complete search history.

(56) References Cited

U.S. PATENT DOCUMENTS

| | | | |
|---|---|---|---|
| 5,936,607 A | 8/1999 | Allio | |
| 5,959,701 A | 9/1999 | Watanabe et al. | |
| 6,099,134 A | 8/2000 | Taniguchi et al. | |
| 6,224,223 B1 | 5/2001 | Higuchi et al. | |
| 6,552,848 B2 * | 4/2003 | Kobayashi | 359/457 |
| 6,714,173 B2 | 3/2004 | Shinoura | |
| 6,734,929 B2 | 5/2004 | Sugiura et al. | |
| 2005/0207035 A1 | 9/2005 | Nagao | |
| 2008/0316392 A1 | 12/2008 | Arima et al. | |

FOREIGN PATENT DOCUMENTS

| | | |
|---|---|---|
| EP | 1 122 586 A2 | 8/2001 |
| EP | 1 195 991 A1 | 4/2002 |
| EP | 1 336 876 A1 | 8/2003 |
| EP | 1 455 203 A1 | 9/2004 |
| JP | 2001-034183 | 2/2001 |
| WO | WO 2004/099823 A2 | 11/2004 |

OTHER PUBLICATIONS

Vikuiti Display Enhancement Newsletter—Feb. 2007, 3 pgs.

* cited by examiner

*Primary Examiner*—Jordan M. Schwartz
*Assistant Examiner*—James C Jones

(57) ABSTRACT

An optical display system is disclosed. The system has an optical light source, a first microstructured optical component having a plurality of first microstructures, and having a nominal first microstructure pitch, $P_1$; and a second microstructure optical component, arranged relative to the first microstructured optical component, having a plurality of second microstructures and having a second nominal microstructure pitch, $P_2$. $P_2/P_1$ has a value closer to the mid-point between consecutive integers than to either one of the consecutive integers.

19 Claims, 13 Drawing Sheets

PRISM PITCH OPTIMIZATION

RELATED APPLICATIONS

This application is a continuation-in-part application of U.S. application Ser. No. 11/445,210 filed on Jun. 2, 2006, which is incorporated by reference herein.

BACKGROUND OF THE INVENTION

The present invention relates generally to an optical display system where Moiré effects are reduced. The optical system can be a liquid crystal display (LCD) illumination system.

Microstructured optical components are common in optical display systems such as LCD illumination systems. For example, LCD illumination systems may include optical components with microstructures such as patterned dots, micro lenses, or microprisms. Typically the patterned dots on the light guide are used to spread the light in the plane of the display, while microprism films having multiple microprisms are used to enhance the luminance of the display. Even though the individual microstructures of these components, such as prisms for the microprism films are small, diffusing layers are still necessary between component films. This is so because each microstructured film and the LCD display (containing numerous pixels) all contain ordered-periodic structures. Due to the close proximity of these components, interference patterns, such as Moiré fringes, caused by the interaction of the component-to-component microstructures can be easily observed by a user.

In particular prismatic or microprism films are a major contributor to Moiré fringes in LCD display systems. Prismatic or microprism films are optical devices that have one or more sides covered by an array of microprisms. Typically these prismatic films have a linear array of microprisms with a pitch in the range of tens of microns. Even if these prismatic films deviate from perfect linearity, they are typically at least substantially periodic and thus prone to producing Moiré effects in optical illumination systems, such as LCD illumination systems.

SUMMARY OF THE INVENTION

According to one embodiment of the invention there is provided an optical display system. The optical display system comprises an optical light source; a first microstructured optical component having a plurality of first microstructures, and having a nominal first microstructure pitch, $P_1$; and a second microstructure optical component, arranged relative to the first microstructured optical component, having a plurality of second microstructures and having a second nominal microstructure pitch, $P_2$, wherein $P_2/P_1$ has a value closer to the mid-point between consecutive integers than to either one of the consecutive integers.

According to another embodiment of the invention there is provided an optical display system. The optical display system comprises an optical light source; a microstructured optical component having a plurality of microstructures, and having a nominal microstructure pitch, $P_f$; and an optical display arranged relative to the microstructured optical component and having a plurality of pixels having a pixel pitch, $P_p$, wherein $P_p/P_f$ has a value closer to the mid-point between consecutive integers than to either one of the consecutive integers.

According to another embodiment of the invention there is provided an optical display system. The optical display system comprises an optical light source; a first microstructured optical component having a plurality of microstructures, and having a nominal first microstructure pitch, $P_1$; and a second microstructure optical component, arranged relative to the first microstructured optical component, having a plurality of second microstructures and having a second nominal microstructure pitch, $P_2$, wherein the Moiré pattern produced by the display due to interaction of light directed by the first microstructured optical component from the light source is characterized by Moiré frequencies $F_m$, where $F_m=m/P_2-1/P_1$, where m is an integer, and characterized by Moiré periods $P_m$, where $P_m=|1/F_m|$, the optical display system having a Moiré period of less than 1.6 mm for the lowest Moiré frequency.

According to another embodiment of the invention there is provided an optical display system. The optical display system comprises an optical light source; a microstructured optical component having a plurality of microstructures, and having a nominal microstructure pitch, $P_f$; and an optical display arranged relative to the microstructured optical component and having a plurality of pixels having a pixel pitch, $P_p$, wherein the Moiré pattern produced by the display due to interaction of light directed by the microstructured optical component from the light source is characterized by Moiré frequencies $F_m$, where $F_m=m/P_p-1/P_f$, where m is an integer, and characterized by Moiré periods $P_m$, where $P_m=|1/F_m|$, the optical display system having a Moiré period of less than 1.6 mm for the lowest Moiré frequency.

DETAILED DESCRIPTION OF THE PREFERRED EMBODIMENTS

Figure 1:
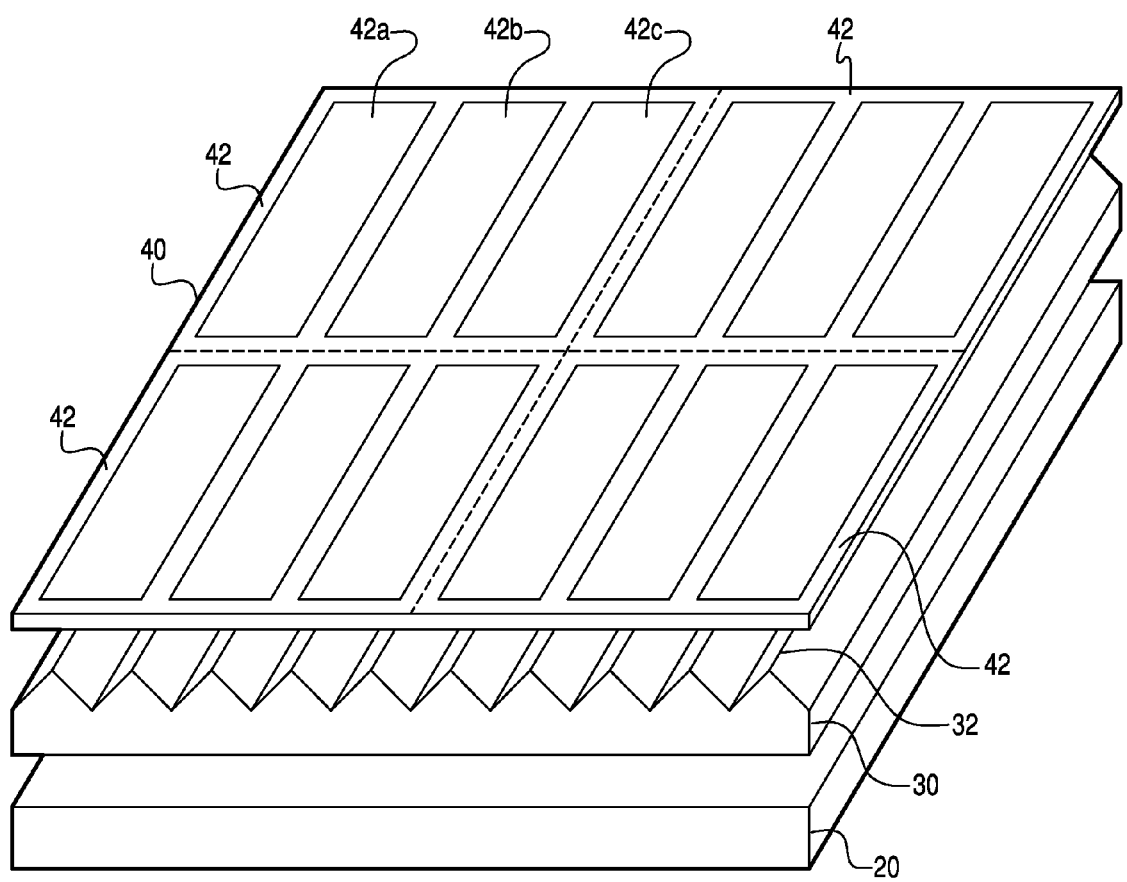
FIG. 1 is a perspective view of an optical display system according to one embodiment of the invention.

FIG. 1 is a perspective view of an optical illumination system, specifically an LCD illumination system 10. The system 10 includes an optical light source 20, at least one microstructured optical component, such as the prismatic film 30, and an optical display, such as the LCD display 40. The optical light source 20 illuminates the prismatic film 30 with light, which is directed by the prismatic film 30 to the LCD display 40. The optical light source 20 may be, for example, a backlight.

Figure 2:
FIG. 2 is a cross-sectional view of a prismatic film of the optical display system of FIG. 1.

The prismatic film 30 includes a number of prisms 32 arranged in substantially a linear fashion, with a pitch $P_f$ (See FIG. 2). While FIG. 1 illustrates the prismatic film 30 arranged between the optical light source 20 and the LCD display 40, the LCD display 40 may be arranged between the prismatic film 30 and the light source 20. Further, the prismatic film 30 may be arranged between the optical light source 20 and the LCD display 40, with a second prismatic film arranged on a side of the LCD display 40 opposite to the prismatic film 30, or even on the same side. The system may include a prismatic film with its prisms oriented along a perpendicular direction to the direction of the prisms in the prismatic film 30, i.e., one of the prismatic films may have prisms with a vertical orientation, and the other a horizontal orientation, for example.

The LCD display 40 includes a number of pixels 42, each pixel comprising subpixels 42a, 42b and 42c, where the subpixels 42a, 42b and 42c may be red, blue and green, respectively, for example. The subpixels 42a, 42b and 42c are positioned progressively along the horizontal direction.

As shown in FIG. 2, the array of prisms 32 of the prismatic film 30 are characterized by a pitch $P_f$, which is the distance between the peaks of adjacent prisms 32. FIG. 2 illustrates the array to be linear, but the array of prisms 32 may be substantially linear on even non-linear.

Figure 3:
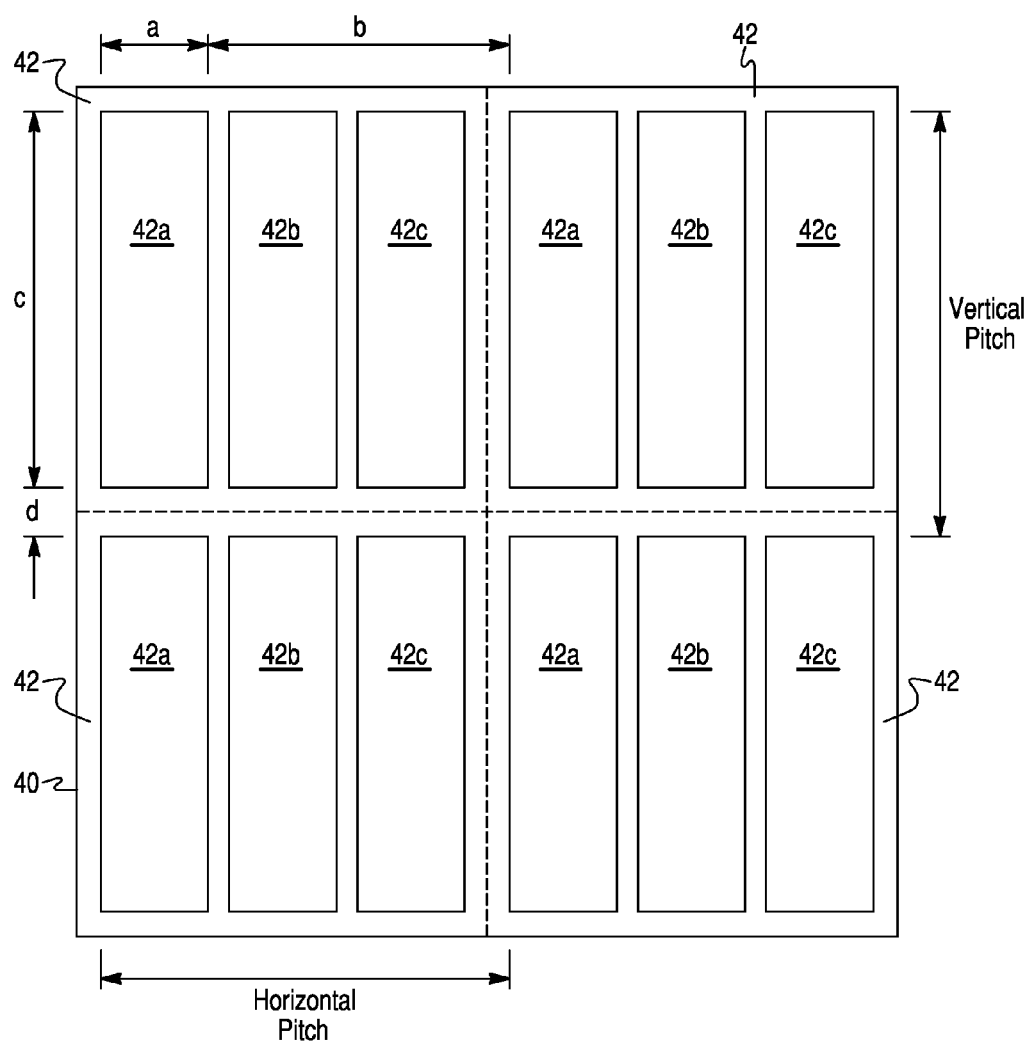
FIG. 3 is a top view of the optical display of the optical display system of FIG. 1.

FIG. 3 illustrates the structure and geometry of the pixels 42 and subpixels 42a, 42b and 42c of the LCD display 40. For the sake of illustration, FIG. 3 illustrates only four pixels 42, but in general the display 40 may include many more pixels. The pixels 42 are arranged in a rectangular pixel geometry in FIG. 3, but in general the invention is not so limited to any particular geometry, and may be arranged in a hexagonal geometry, for example.

The pixels 42 in the rectangular geometry are characterized by a horizontal pixel pitch, $P_{ph}$, and a vertical pixel pitch, $P_{pv}$. The horizontal pixel pitch, $P_{ph}$, is the distance between corresponding points on adjacent pixels 42 in the horizontal direction, while the vertical pixel pitch, $P_{pv}$, is the distance between corresponding points on adjacent pixels 42 in the vertical direction.

The pixels 42 are characterized by both a horizontal fill factor, $F_h$, and a vertical fill factor, $F_v$. The horizontal fill factor represents the fractional distance of a pixel 42 covered by one of the subpixels, while the vertical fill factor represents the fractional distance covered by one of the pixels in the vertical direction. Typical pixel pitches may be between 50 μm and 1000 μm, while typical fill factors may be between 0.1 and 0.99 (0.23 and 0.92 even more typically).

Presuming that the subpixels are the same size, the horizontal and vertical pixel pitches, $P_{ph}$ and $P_{pv}$ respectively, and the horizontal and vertical fill factors, $F_h$ and $F_v$ respectively, are given by:

$$P_{ph}=a+b, F_h=a/(a+b)$$

$$P_{pv}=c+d, F_v=c/(c+d)$$

where a is the width of one subpixel, b is the difference between the width of a pixel and one subpixel, c is the length of one subpixel, and d is the vertical spacing between adjacent subpixels.

The analysis for the case of a display system with a prismatic film will depend upon the orientation of the axis of the prismatic film relative to the pixels of the display. An analysis is now provided for the case where prismatic film is oriented with an axis in the horizontal direction, i.e., the prisms run in the horizontal direction, and for the case where prismatic film is oriented with an axis in the vertical direction, i.e., the prisms run in the vertical direction. For this analysis each color channel can be treated independently. The results can be summed to determine the overall effect.

The possible Moiré patterns depend upon whether the prismatic film has a vertical orientation or a horizontal orientation: 1) the prisms with a horizontal axis will interact with the vertical pitch direction of the LCD display 40 to produce gray fringes; and 2) the prisms with a vertical axis will interact with the horizontal pitch direction to produce color fringes. For situation 1), the fringes are gray because the color sub pixels are in-phase in the vertical direction. For situation 2), the fringes are colored because the color sub pixels are out of phase in the horizontal direction due to the spatial offset of each of the color channels. Situation 2) results in a relative phase shift in the Moiré fringes between red, blue and green.

The pixel modulation transfer function (MTF) characterizes the ability of the pixels to transmit or resolve the Moiré pattern due to the interaction of the light from the prism films with the pixels to produce visible fringes. This function has values between 0 and 1, where 0 indicates that no Moiré pattern is produced and 1 indicates the maximum Moiré pattern, i.e., maximum intensity of the fringes. The MTF provides a relative quantity, the absolute strength of the Moiré pattern depends on many factors such as the specific geometric details of the prisms, the optical source, and prism refractive index, for example.

The MTF for the specific rectangular geometry described above depends on the pitch of the prisms, and the pixel fill factor and pitch as:

$$MTF = \left| \text{sinc}\left[\frac{P_p F}{P_f}\right] \right|,$$

where $P_f$ is the prismatic film pitch, and F and $P_p$ are the pixel fill factor and pixel pitch in a more generic form without horizontal and vertical subscripts. The sinc function is given by $$\text{sinc}(x) = \frac{\sin(\pi x)}{\pi x}.$$

It can be seen that the MTF has values of zero, corresponding to no Moiré pattern, when $$\frac{P_p F}{P_f} = m \text{ or}$$

$$P_f = P_p F / m,$$

where m is an integer. The Latter equation provides optimal values of prism pitch, i.e., no Moiré pattern for a particular pixel geometry when the equation is satisfied.

For pixels with different horizontal vertical fill factors, a horizontal MTF, $MTF_h$, and a vertical MTF, $MTF_v$, may be expressed as:

$$MTF_h = \left| \text{sinc}\left[\frac{P_{ph} F_h}{P_{fh}}\right] \right| \quad MTF_v = \left| \text{sinc}\left[\frac{P_{pv} F_v}{P_{fv}}\right] \right|,$$

so that $$P_{fh} = \frac{P_{ph} F_h}{m_h} \text{ and } P_{fv} = \frac{P_{pv} F_v}{m_v}$$

are the relationships to satisfy for no Moiré pattern for a horizontally and vertically oriented prismatic film, respectively, and $m_h$ and $m_v$ are integers.

While the relationship above illustrates the MTF being zero, and thus m, $m_h$ and $m_v$ being integers, this condition may be relaxed somewhat and m, $m_h$ and $m_v$ may be nearly integers so that the MTF is low, but not zero. For example, m, $m_h$ and $m_v$ may integers±0.2.

Further, in practice the prismatic films may be offset slightly from a perfectly horizontal or vertical orientation, so that they are substantially horizontal or vertical in orientation. In this case the horizontal prism pitch may be an effective horizontal prism pitch. The effective horizontal prism pitch will be the perfect horizontal prism pitch multiplied by 1/cos (θ), where θ is the rotation of prismatic film relative to perfectly horizontal. In a similar fashion, the horizontal prism pitch may be an effective horizontal prism pitch. The effective vertical prism pitch will be the perfect vertical prism pitch multiplied by 1/cos(θ), where θ is the rotation of prismatic film relative to perfectly vertical.

Further, while the above analysis describes a prismatic film with either horizontal or vertical orientation, in practice the optical display system may include two prismatic films, one with horizontal orientation and the other with vertical orientation such that both the conditions $$P_{fh} = \frac{P_{ph} F_h}{m_h} \text{ and } P_{fv} = \frac{P_{pv} F_v}{m_v}$$

are met.

Depending upon the geometry of the pixels and the prisms, it may not be possible to select a prism pitch that reduces the MTF to zero. In this case, however, the prism pitch may still be selected to reduce MTF to a minimum value. Also, the identical fill factor assumption may not hold in all cases. This may require a compromise solution, such as using the mean fill factor for all color channels as the effective fill factor, for example.

In addition to minimizing Moiré by a proper choice of prism and pixel pitch for a given geometry as described above, Moiré may also be reduced using a randomization technique that randomly modulates the regular structure of the prisms of the prismatic film. This randomization technique may be combined with and complements the pitch selection technique described above to reduce Moiré.

Figure 4:
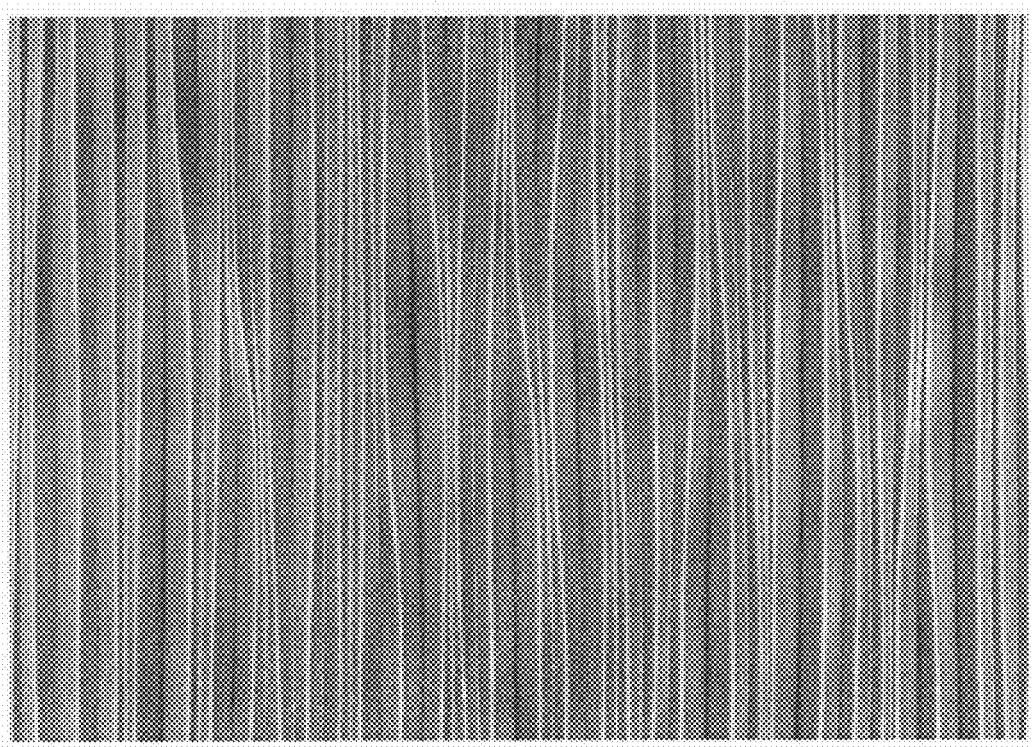
FIG. 4 is a top view of a portion of an exemplary sample of a prismatic film according to an embodiment of the invention.

FIG. 4 is a top view of a portion of exemplary sample of a prismatic film where the regular prismatic structure has been randomly modulated. The sample prismatic film has a surface defined by an array of prism structures having a nominal pitch of approximately 37 μm (spacing between adjacent peaks of the prism structures). Each of the prism structures extends generally in the horizontal direction parallel to the other prism structures. The position of the prism peaks was modulated in the horizontal direction (the horizontal direction in the plane of the paper in FIG. 4) by approximately up to ±18 μm. The position of the prism peaks may be modulated independently for different prisms. While FIG. 4 illustrates a prismatic film where the path of the prism peak position is randomly modulated laterally, the invention is not so limited, and other parameters of the prism structures may be modulated, such as the phase, peak height, and peak angle, for example.

The effect of random modulation on the Moiré fringe pattern intensity may be expressed in terms of the relative Moiré RM(σ), as RM(σ)=|$M_m(\sigma)/M_m(0)$|, where the σ is a measure of the amount of randomization and is the standard deviation in lateral prism peak position about the prism peak mean position, which corresponds to the nominal pitch. $M_m(\sigma)$= ($I_{max}$−$I_{min}$)/($I_{max}$+$I_{min}$), where $I_{max}$ is the maximum value of the intensity of the Moiré fringe pattern and $I_{min}$ is the minimum value of the intensity of the Moiré fringe pattern. $M_m(\sigma)$ is a value for the amount of randomization σ, and $M_m(0)$ is a value for no randomization, i.e, the prism structures are not modulated.

Figure 5:
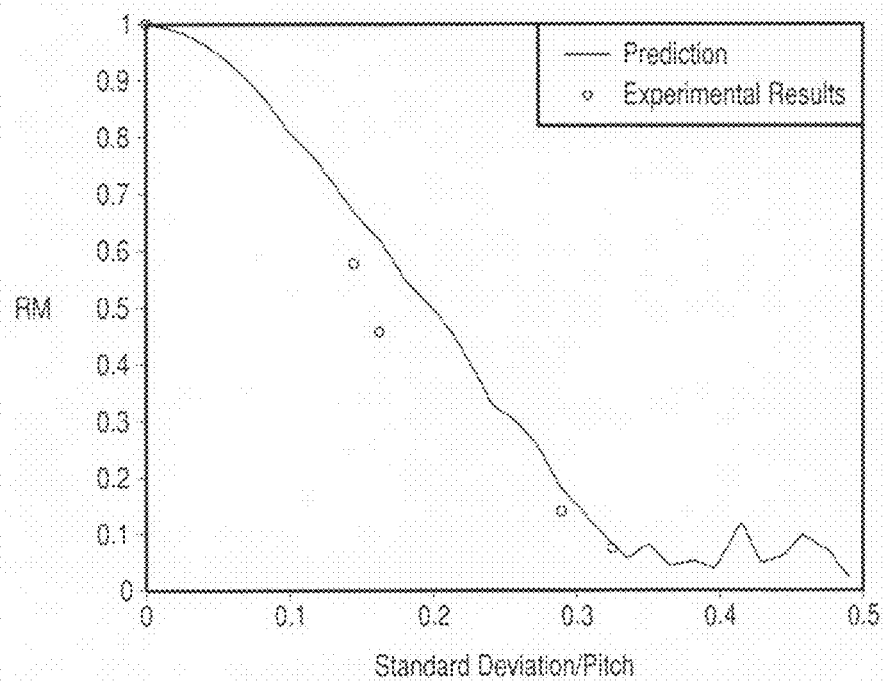
FIG. 5 is a graph illustrating the relative Moiré (RM) as a function of the prism random modulation ((standard deviation of the prism peak position/prism pitch) for both predicted and experimental values.

FIG. 5. illustrates the RM as a function of the ((standard deviation of the prism pitch)/(prism pitch)). Both prediction values and experimental values are shown.

Figure 6:
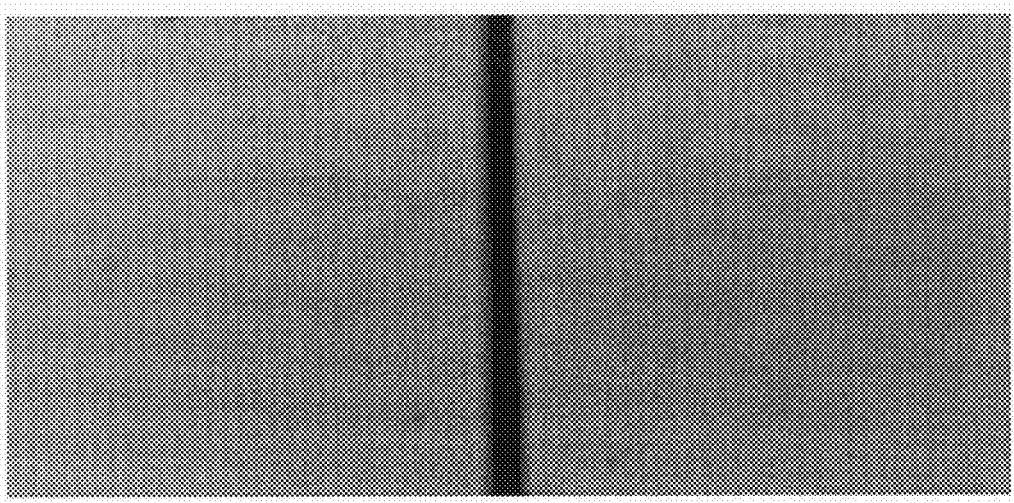
FIG. 6 is a digitized image of a modulated structure and of a linear array reference with the same nominal prism pitch.

The RM of surface structures of this design was studied as a function of prism modulation standard deviation and compared to a linear array of the same nominal pitch. This was accomplished via the use of a backlight module and camera to photograph Moiré patterns formed by the interaction of horizontally oriented prismatic films placed side-by-side underneath various LCD displays. The RM was computed from digitized images of a modulated structure and a linear array reference with the same nominal prism pitch and prism geometry photographed simultaneously. A representative image is shown in FIG. 6. The reference array appears on the left hand side of FIG. 6 and is used to compute the RM of the right-side film.

The RM was computed as the amplitude of Moiré fringes for the modulated prism structure (left side of FIG. 6) divided by the amplitude of Moiré fringes for the linear array prism structure (right side of FIG. 6) with the same geometric parameters (nominal pitch and prism geometry). The RM indicates the ratio by which the modulated prism structure reduces Moiré compared to a linear array in the same context.

Figure 7:
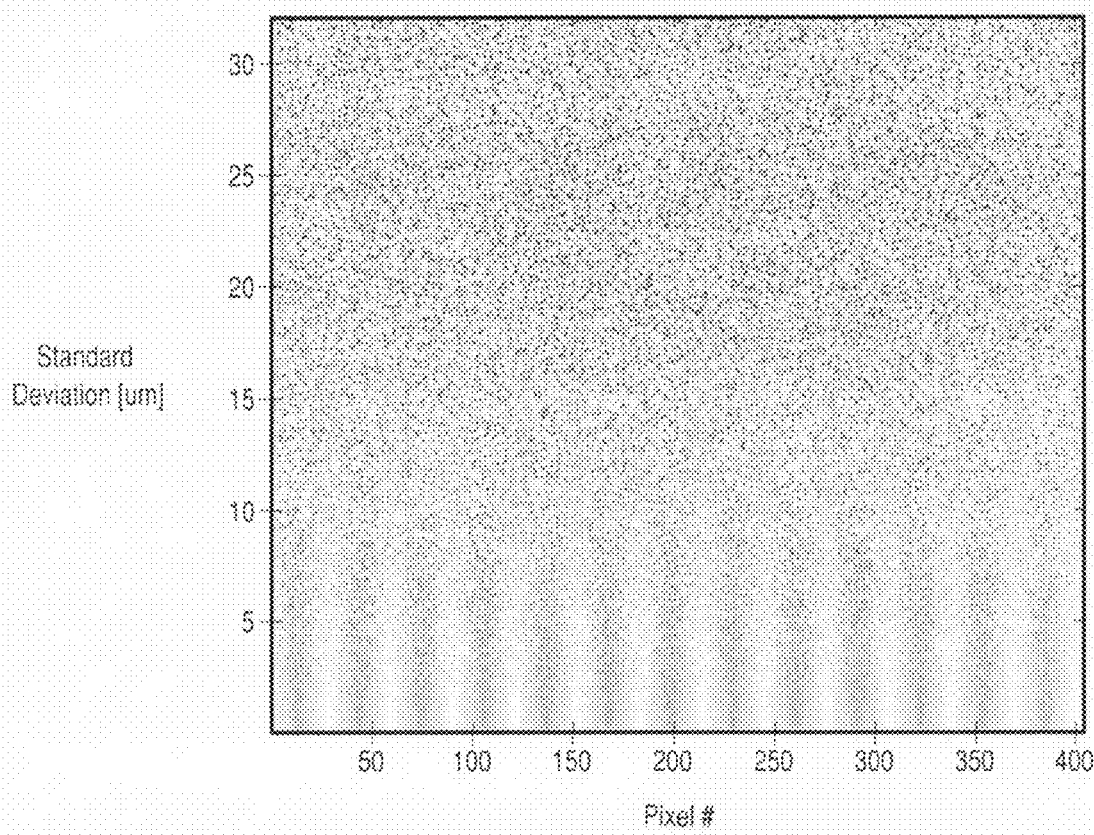
FIG. 7 illustrates Moiré fringes for different standard deviations of the peak position from the mean peak position.

For the predicted results in FIG. 5, it should be noted that a Moiré signature for a film can be shown by simply sampling the surface in a way that is representative of the masking provided by the LCD display structure. For the results shown in FIG. 7, a 50 mm section of the simulated structure is sampled every 123 µms to simulate the effect of viewing the surface though an array of 123 µm pixels assuming a low fill factor in one dimension. The prism pitch is 31 µm so that the pitch of the fringes is expected to be 3.81 mm or 12 fringes across the image in FIG. 7. Each row in the image shown in FIG. 7 illustrates the Moiré fringes for the aliased sampled cross section from a modulated surface. From bottom to top in FIG. 7, σ is increased from σ=0 µm to σ=32 µm. In the figure the predicted fringes are clearly visible for σ<10 µm.

The predicted results were plotted and compared to the experimental results of the structure of FIG. 6, and the comparison is shown in FIG. 5. The predicted curve shown is somewhat jagged due to the fact that a new random sequence for modulating the prism structures is applied at each case. Additionally the particular random sequence used in the prediction model is not the same as for the experimental films. This jagged effect is more pronounced at larger standard deviations where the Moiré fringes are substantially obscured. Each point on the predicted curve is the result of spatial analysis of the intensity of Moiré fringes for each pixel row in the image shown in FIG. 7. FIG. 7 illustrates Moiré fringes for different stand deviations of the peak position from the mean peak position. The experimental results are obtained similarly using the sum of the Moiré fringe intensity for each columns of each sample shown in FIG. 6 (Note that the orientation of this image is rotated relative to FIG. 7). Here it is shown that for ratio of standard deviation over pitch greater than 0.3 the RM is less than 0.1. This is due to the Moiré fringes having been substantially eliminated.

The combined effect of the random modulation on prism structure and the prism pitch optimization can be expressed as the Moiré Modulation, M-bar (symbolized by M with a bar thereover), where the subscripts h and v denote the Moiré Modulation in the horizontal and vertical directions, i.e, due to prismatic films oriented in the horizontal and vertical directions, respectively:

$$\overline{M}_h = RM(\sigma)MTF_h = RM(\sigma)\left|\text{sinc}\left[\frac{P_{ph}F_h}{P_{fh}}\right]\right|$$

$$\overline{M}_v = RM(\sigma)MTF_v = RM(\sigma)\left|\text{sinc}\left[\frac{P_{pv}F_v}{P_{fv}}\right]\right|.$$

The pitch and fill factor relationships are not changed by the addition of the RM term, but the range of Moiré Modulation, M-bar, relative to MTF is reduced below 1 by relative Moiré RM.

The parameters of optical display system may vary, but certain parameters are preferred. The RM is preferably less than 0.75, and more preferably less than 0.50. The Moiré Modulation is preferably less than 0.04. The microstructure pitch $P_f$ is preferably between 1 µm and 200 µm, and more preferably between 26 µm and 48 µm. The pixel pitch $P_p$ is preferably between 25 µm and 10 mm, and more preferably between 50 µm and 700 µm. The fill factor F is preferably between 5% and 100%, and more preferably between 14% and 100%.

Figure 8:
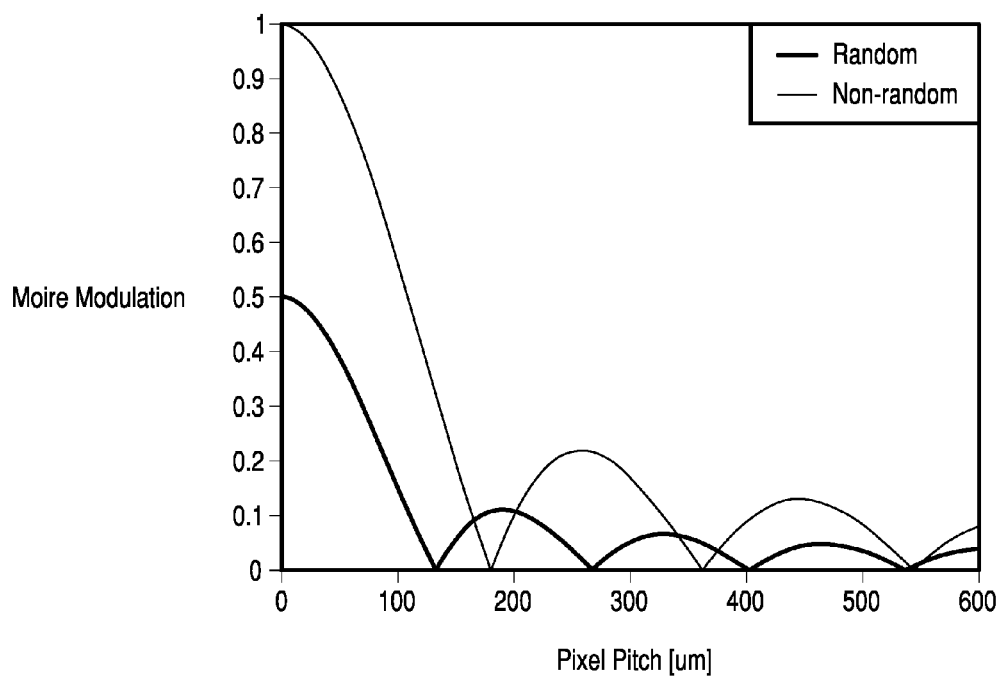
FIG. 8 is a graph comparison of the Moiré modulation for the horizontal direction for a system with a prismatic film with random modulation of the prism structures and for a system without random modulation of the prism structures.
Figure 9:
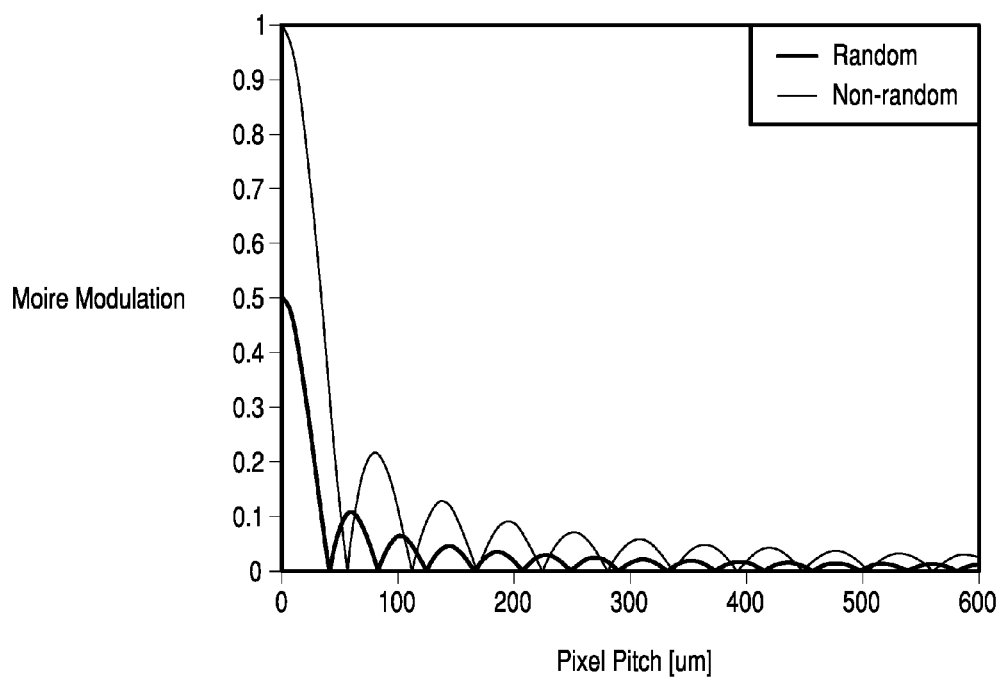
FIG. 9 is a graph comparison of the Moiré modulation for the vertical direction, for a system with a prismatic film with random modulation of the prism structures and for a system without random modulation of the prism structures.

FIGS. 8 and 9 are a comparison of the Moiré Modulation for the horizontal direction and vertical direction, respectively, for a system with a prismatic film with random modulation of the prism structures and for a system without random modulation of the prism structures. The vertical fill factor for FIG. 9 is 0.89, while the horizontal fill factor for FIG. 8 is 0.27. The system with a random modulation has a nominal prism pitch of 37 µm, while the system without random modulation has a prism pitch of 50 µm. The maximum value of M-bar is assumed to be 0.5 for the system with random modulation, and 1.0 for the system with no random modulation. As shown in FIGS. 8 and 9, the average Moiré modulation for the prismatic film with random modulation is about 0.04 for pixel pitches between 100 µm and 600 µm, while for the prismatic film without random modulation the average Moiré modulation is about 0.12 over the same pixel pitch range. While the prism pitches are not the same for the systems with and without random modulation, it can be seen from FIGS. 8 and 9, that the random modulation significantly reduces the average Moiré modulation.

The lower pitch and randomized design of the system using the randomly modulated prism structure results in substantially reduced Moiré compared to the system without random modulation in most cases of pixel pitch. This is especially remarkable since the prismatic film with the random modulation has higher brightness than that without.

As discussed above, the Moiré fringe intensity may be reduced to zero or near zero by choosing an appropriate prism pitch for a given pixel pitch and geometry. However it is also possible to obtain good performance across a wide range of pixel pitches and fill factors with only a limited choice in prism pitches. For example if the spatial frequency (one divided by $P_f$) of a starting prism design is given by $f_o$ then a family of film designs can be defined such that for n different choices in the family $$f_i = f_o + \frac{f_o i}{n},$$

where i=0, n−1

In this family of films the spatial frequencies are spaced equally between $f_o$ and two times $f_o$.

Figure 10:
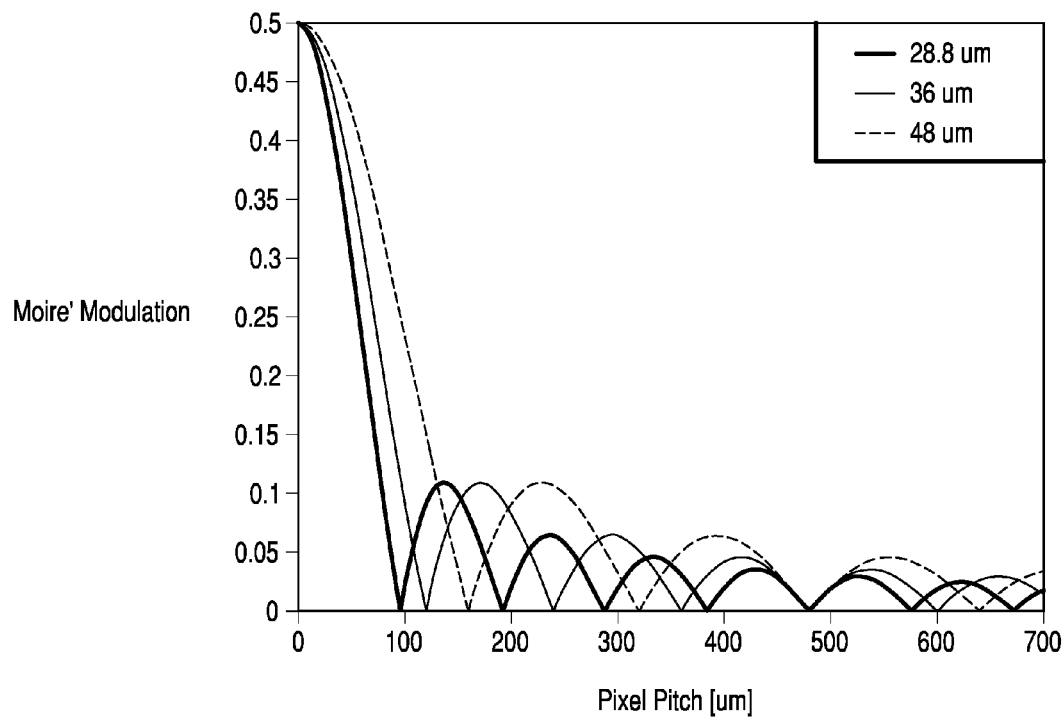
FIG. 10 is a graph illustrating the Moiré modulation for each individual prism pitch design of a family of three prism pitches as a function of pixel pitch for a system with random modulation of the prism structures.
Figure 11:
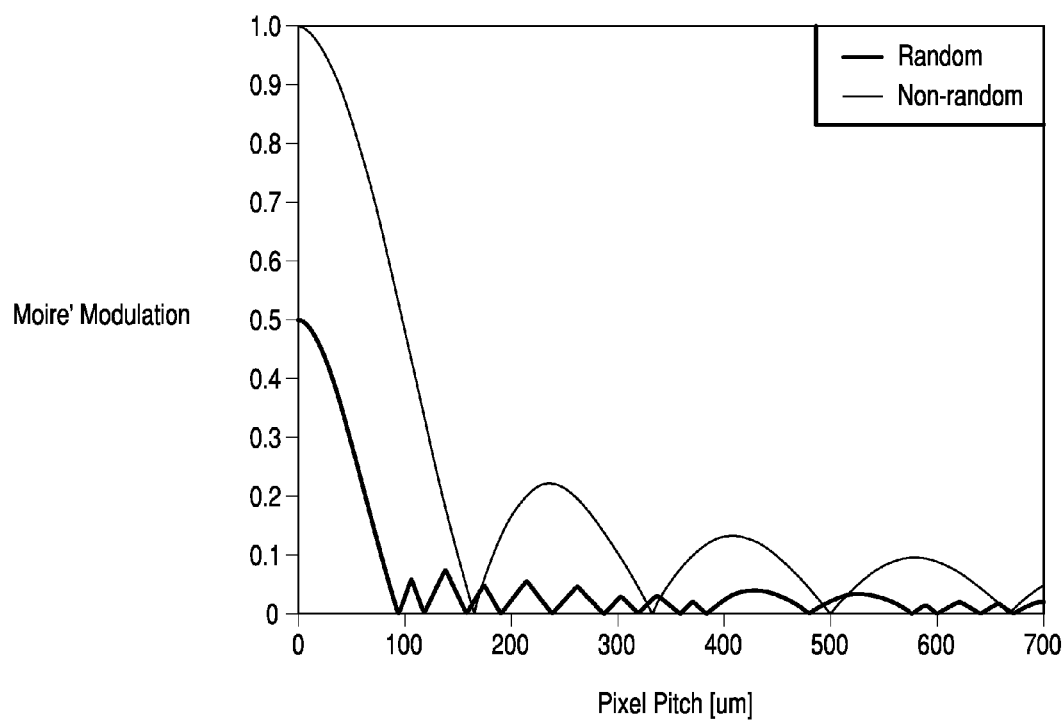
FIG. 11 is a graph illustrating the Moiré modulation for the best choice of prism pitch in the family of prismatic films of FIG. 10 and compared to the Moiré modulation for a system without random modulation of the prism structures.

Results for this approach using 28.8 µm, 36 µm and 48 µm pitches as $f_o$ are shown in FIGS. 10 and 11.

FIG. 10 illustrates the Moiré modulation for each individual prism pitch design as a function of pixel pitch for a pixel fill factor of 30% for a family of three prism pitches for a system with random modulation of the prism structures. FIG. 11 illustrates the Moiré modulation for the best choice of prism pitch in this family of three prismatic films (lowest Moiré modulation for each pixel pitch) as compared to the Moiré modulation for a prismatic film without random modulation of the prism structures. As shown in FIG. 11, the average modulation for the best choice in the family of prismatic films is about 0.02 for pixel pitches between 100 μm and 600 μm.

Figure 12:
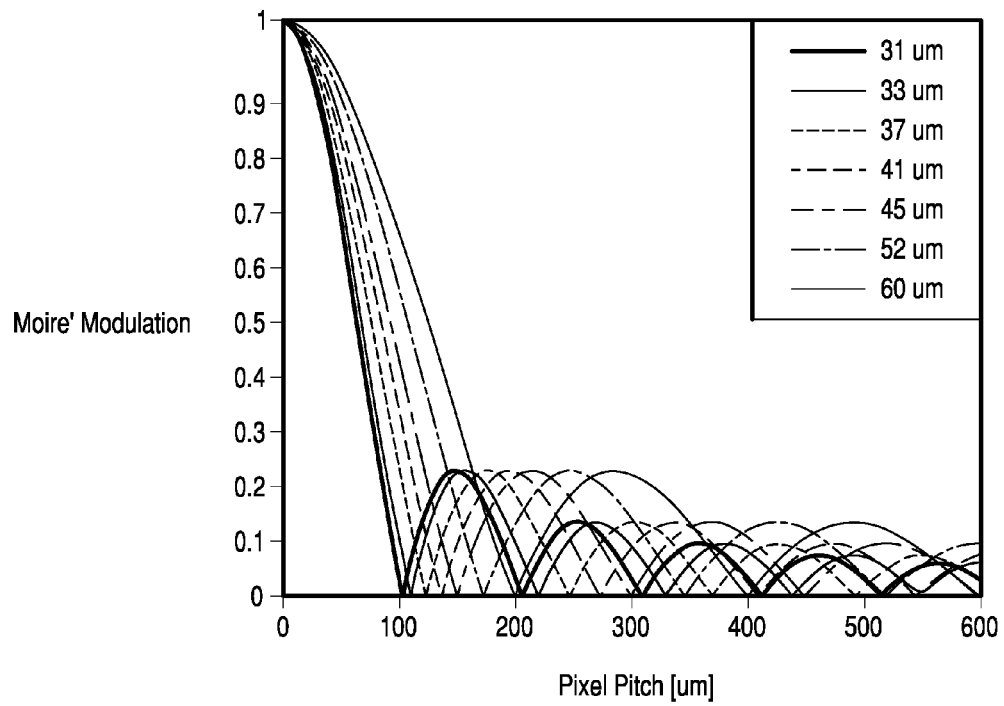
FIG. 12 is a graph illustrating the Moiré modulation for each individual prism pitch design of a family of seven prism pitches as a function of pixel pitch for a system without random modulation of the prism structures.
Figure 13:
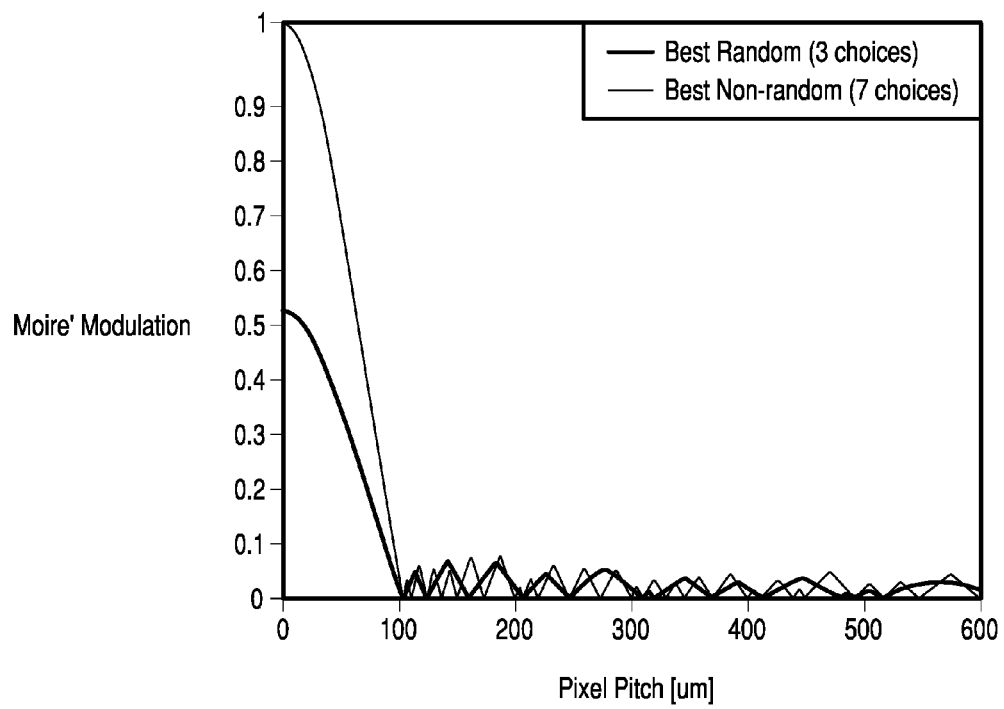
FIG. 13 is a graph illustrating the Moiré modulation for the best choice of prism pitch in the family of prismatic films of FIG. 10 for a system with random modulation of the prism structures compared to the best choice of prism pitch in the family of prismatic films of FIG. 12 for a system without random modulation of the prism structures.

The concept of using a family of pitches can be also applied to prismatic films without random modulation of the prism structure as shown in FIGS. 12 and 13, where n is larger (n equals 7 in FIG. 12) to achieve a similar performance to that with random modulation. As shown in FIG. 13, the average Moiré modulation for the best choice in the family of seven prismatic films without random modulation of the prism structures is about 0.02 for pixel pitches between 100 μm and 600 μm. FIG. 13 illustrates the Moiré modulation for the best choice of prism pitch for the family of three prismatic films (see FIG. 10) for a system with random modulation of the prism structures compared to the best choice of prism pitch in the family of seven prismatic films (see FIG. 12) for a system without random modulation of the prism structures. As can be seen, the system with only three prismatic films and random modulation compares quite well to the system with seven prismatic films but no random modulation.

Figure 14:
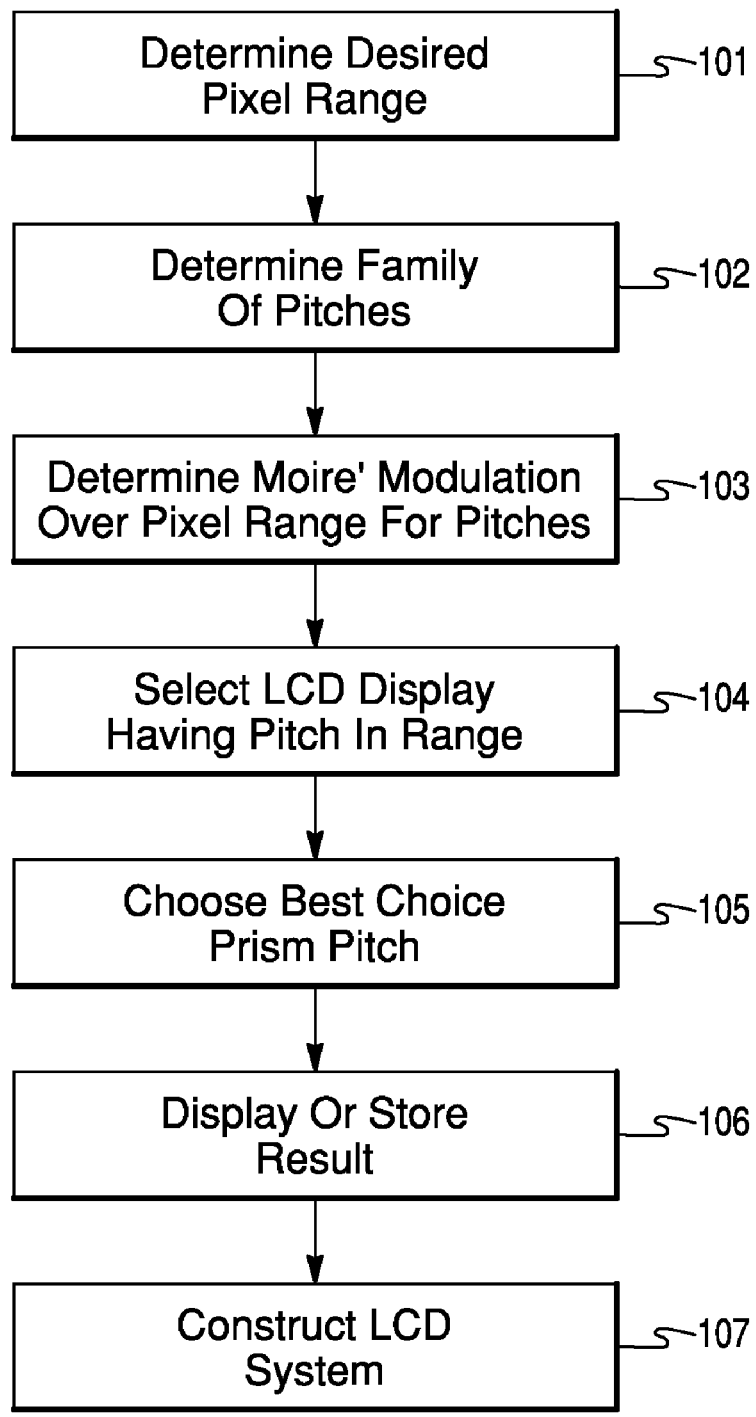
FIG. 14 is a flow chart illustrating a method of determining the best choice of a family of prismatic films for used with a particular pitch and geometry.

In general the procedure for determining the best choice of a family of prismatic films for use with a particular pixel pitch and geometry is as follows as illustrated in FIG. 14. In step 101, the range of desired pixel pitches is determined. A family of prismatic film pitches is then determined in step 102. Determining the family of prism pitches may be performed as discussed above using spatial frequency and equal spacing over a range of frequencies, or some other technique may be employed. In general, it is preferred that family of prism pitches be roughly evenly spaced over the range of prism pitches selected for the family. In step 103 the Moiré modulation is determined over the range of desired pixel pitches for the prism pitches in the family of prism pitches, such as by the techniques discussed above for determining the Moiré modulation. In step 104, an LCD display having a particular pitch in the range of desired pixel pitches is selected. In step 105, the prismatic film with a pitch exhibiting the lowest Moiré modulation is chosen from the family of pitches as the best choice for selected LCD display having a particular pixel pitch within the range of the desired pixel pitches.

Steps 101 to 105 may be performed using an appropriate computer program embodied in a medium executable on a computer system. The results of the best choice prism pitch or the particular pixel pitch may be stored in a memory of the computer system or displayed on a display of the computer system, if desired, in step 106. In step 107, an LCD system is constructed using a prismatic film with the best choice pitch and the selected LCD display.

The Moiré fringes of the Moiré pattern are characterized by Moiré frequencies of the fringes. The particular frequencies should also be considered when choosing the components (LCD display and prismatic film, for example) for the display system. The Moiré frequencies due to a periodic prismatic film (or other periodic microstructured film) is given as $$F_m = m/P_p - 1/P_f$$

where $P_p$ is the LCD pixel pitch in the direction under analysis (vertical or horizontal) and $P_f$ is the pitch of the prisms, and m is an integer. The period that corresponds to each frequency is given by $P_m = |1/F_m|$. Of particular interest is the lowest aliased frequency since this replicant will typically be the replicant that is observable.

Figure 15A:
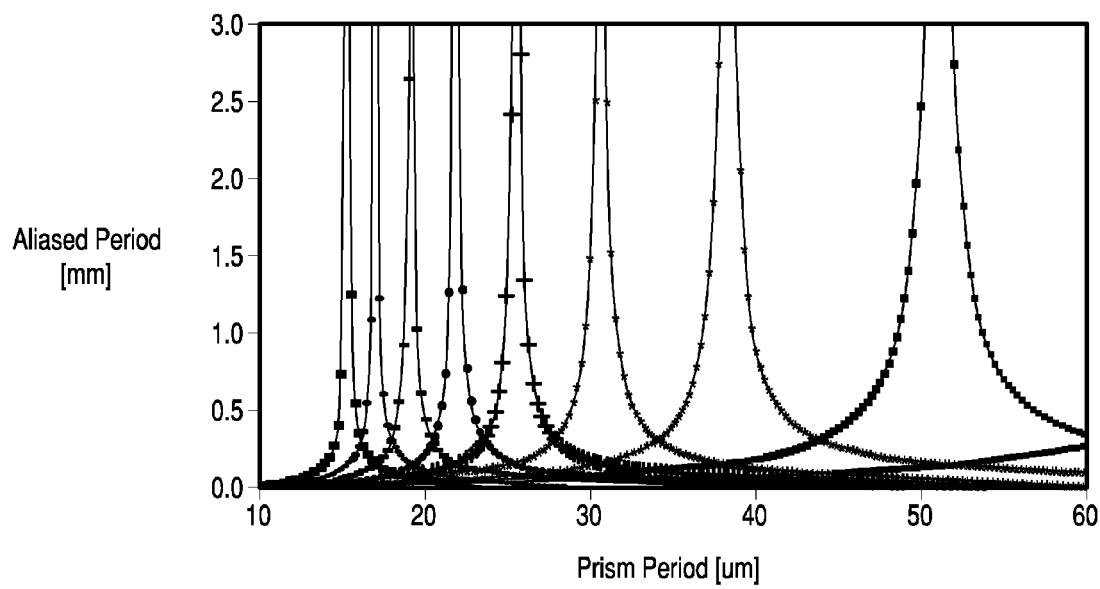
FIGS. 15A and 15B illustrate replicant spectra for 153 μm and 200 μm pitch pixel displays, respectively.
Figure 15B:
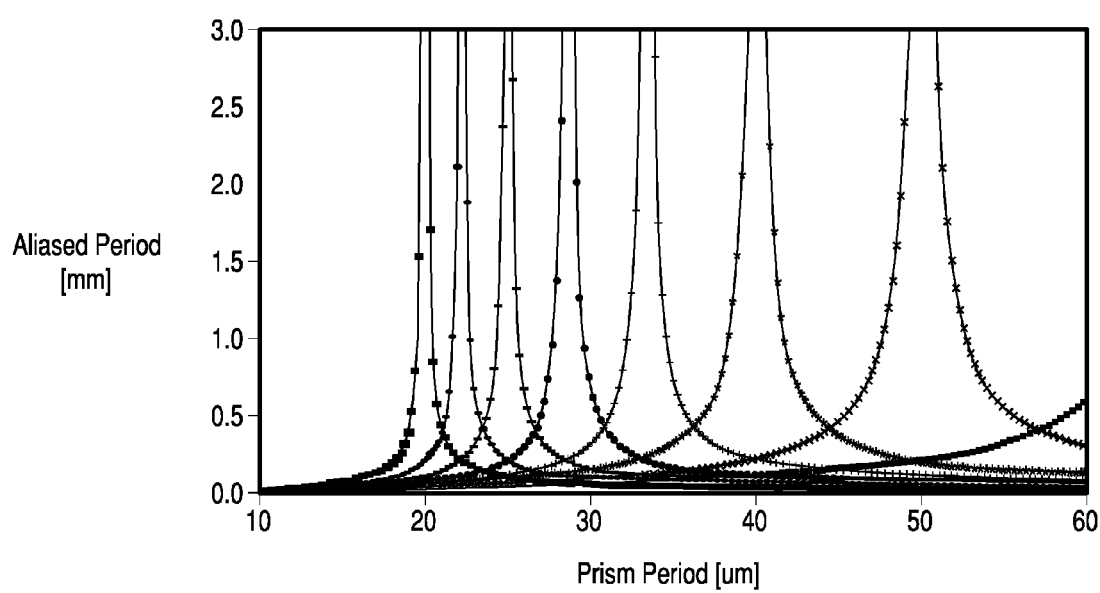

FIGS. 15A and 15B illustrate the aliased period vs. periodic prism period for two different pixel pitches. FIGS. 15A and 15B illustrate replicant spectra for 153 μm and 200 μm pitch pixel displays, respectively. In interpreting this figure, one must consider that there is a complex interaction in the human eye to the pattern in the LCD display and the texture of the components in the display, such as the prismatic film, and how these components interact. The human visual system has the highest spatial contrast sensitivity to patterns with an angular frequency of 5 cycles/degree (spatially equivalent to 1.6 mm for a viewing distance of 18 inches) and decreased sensitivity for values above or below this angular frequency. As such it is advisable to avoid Moiré fringes that have angular frequencies close to this value providing high spatial contrast sensitivity.

Given two displays that exhibit Moiré Modulation of equal proportions, if one of the displays exhibits Moiré Modulation with higher frequency artifacts, this display may be viewed as superior. In general it is best to choose a combination of $P_f$ and $P_p$ such that the period of Moiré fringes is less than 1.6 mm when possible, and preferably less than 0.5 mm. This consideration can be combined with the aim of low Moiré modulation as described above.

In general for a first optical display system and a second optical display system having a same Moiré modulation, the best optical display system may be chosen and constructed as follows. First, the first optical display system and the second optical display system having the same Moiré modulation are determined, where the first optical display system has a Moiré period less than 1.6 mm, and the second optical display system has a Moiré period greater than 1.6 mm. Then the first optical display system is chosen as the chosen optical display system, and the chosen optical display system is constructed.

For systems that include both a prismatic film with horizontal orientation as well as a prismatic film with vertical orientation of prisms where the prismatic films have the same pitch, the best choice system will involve choosing the prism pitch to reduce the MTF for both vertical and horizontal directions, while staying away from prism pitches that produce Moiré fringes with a large period (low frequency Moiré fringes).

Figure 16:
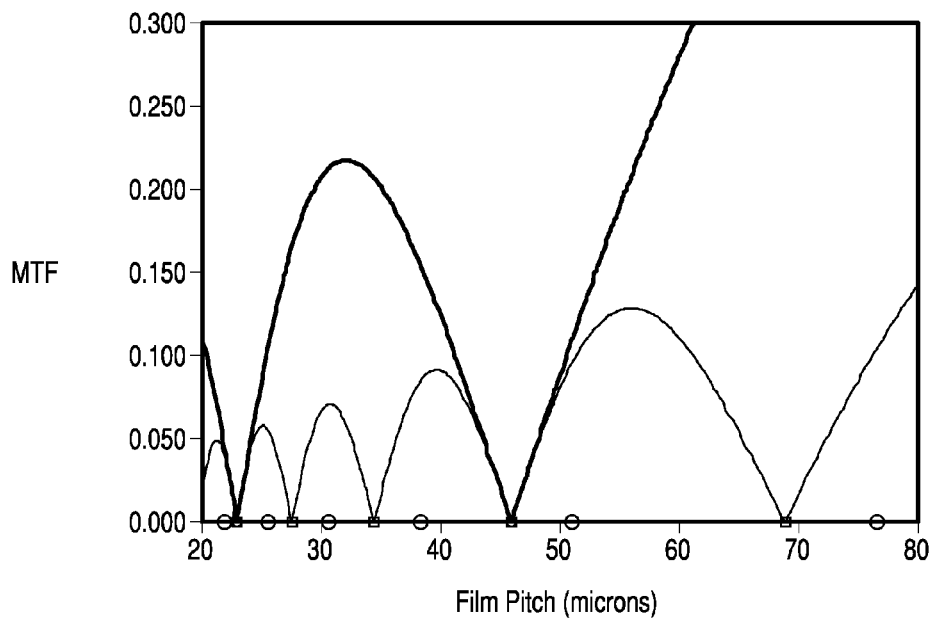
FIG. 16 illustrates the MTF as a function of vertical and horizontal prism pitch along with the pitches for which the Moiré fringe period approaches infinity for one system.
Figure 17:
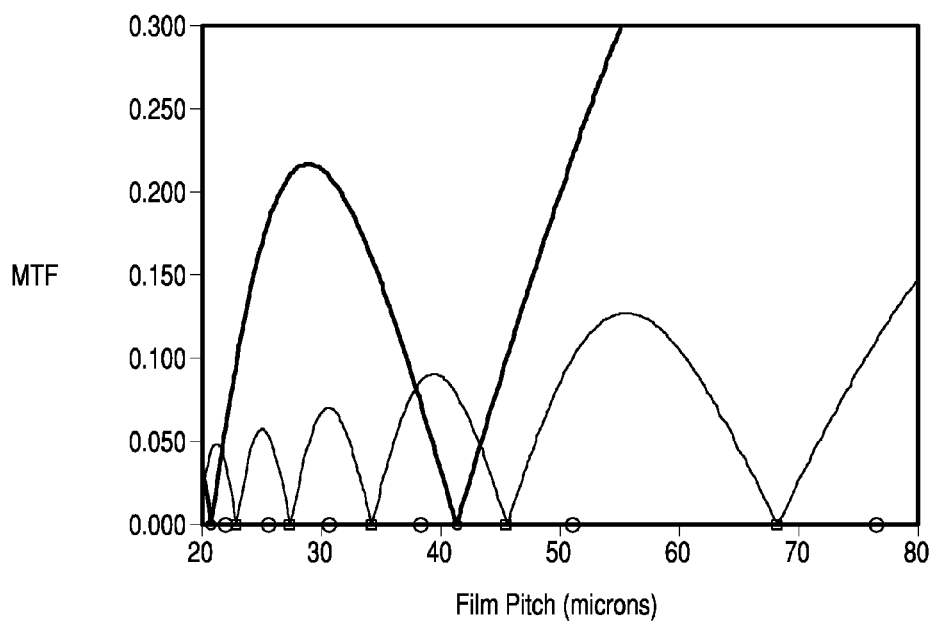
FIG. 17 illustrates the MTF as a function of vertical and horizontal prism pitch along with the pitches for which the Moiré fringe period approaches infinity for another system.

FIGS. 16 and 17 illustrate this concept for two different systems, one where the vertical fill factor is an integer times the horizontal fill factor (FIG. 16), and one where vertical fill factor is not an integer times the horizontal fill factor (FIG. 17).

FIG. 16 illustrates the MTF as a function of film pitch both for horizontal and vertical orientation of a prismatic film. The system in FIG. 16 has an LCD display with a pixel pitch of 153 μm, a horizontal fill factor of 0.3, and a vertical fill factor of 0.9. The thin line illustrates the MTF as a function of prism pitch for a vertically orientated prismatic film, while the thick line illustrates the MTF as a function of prism pitch for a horizontally orientated prismatic film. The open circles in FIG. 16 represent the prism pitch that correspond to Moiré fringe periods that approach infinity. Prism pitches near the open circles are to be avoided. In the system of FIG. 16, because the ratio of the vertical fill factor to the horizontal fill factor is an integer, a zero MTF value for a vertical prism pitch lines up with a zero MTF for a horizontal prism pitch. Of the prism pitches 23.0 and 45.9 that correspond to zero MTF for vertical (and horizontal) pitch, the best choice is 45.9 because it is further from one of the open circles corresponding to a large Moiré fringe period.

FIG. 17 illustrates the MTF as function of film pitch both for horizontal and vertical orientation of a prismatic film, but where the ratio of the vertical fill factor to the horizontal fill factor is not an integer. The system in FIG. 17 has an LCD display with a pixel pitch of 153 μm, a horizontal fill factor of 0.27, and a vertical fill factor of 0.89. The thin line illustrates the MTF as a function of prism pitch for a vertically orientated prismatic film, while the thick line illustrates the MTF as a function of prism pitch for a horizontally orientated prismatic film. As in FIG. 16, the open circles in FIG. 17 represent the prism pitch that correspond to Moiré fringe periods that approach infinity (and are to be avoided). In FIG. 17 because the MTF zeros for the horizontal and vertical cases do not line up, the best choice for a pitch does not result in a zero MTF when the horizontal and vertical prismatic films have the same pitch, and thus the best choice has a low but not zero MTF. As an example of a best choice, a pitch of 43.2 results in a low overall MTF, but is not near an open circle (large Moiré period).

FIGS. 16 and 17 could also be used to determine a best choice prism pitch if only a single prismatic film (vertical or horizontal) is to be used. In this case a pitch should be chosen such that the MTF value is zero, and the pitch is not near one of the open circles (large Moiré period).

As discussed above, low frequency (large period) Moiré fringes are to be avoided. With respect to the Moiré frequency, $F_m$, this criteria can be expressed in terms of the pixel pitch, $P_p$, and prism pitch, $P_f$, where the ratio $P_p/P_f$ should not be near an integer value. Reviewing the equation above for the Moiré frequency, $F_m$, the Moiré frequency, $F_m$, approaches zero as the ratio $P_p/P_f$ approaches an integer value. Preferably, the ratio $P_p/P_f$ should be between two consecutive integers, for example, the ratio $P_p/P_f$ should be (n+½), where n is close to an integer value.

The equation for Moiré frequency from above may be re-written in terms of a Moiré period, $P_m$, as follows: $P_m=1/(m/P_p-1/P_f)$, where m is an integer, or $P_m/P_p=1/(m-P_p/P_f)$, which goes to infinity as $P_p/P_f$ approaches m, and m is an integer, and attains its minimum value of 2 when $P_p/P_f$ is m−½, i.e. centered between integers. The ratio of pixel pitch to prism pitch may be written as $P_p/P_f=m+½±δ$, where m is an integer and $0≦δ≦0.5$. In this equation, the Moiré period is infinity for δ=0.5 and is minimized as δ approaches zero. For example, it is desirable for δ≦0.25, and even more desirable for δ≦0.15.

Returning to FIGS. 15A and 15B, it is clear that δ=0.5 at each prism period where the aliased period goes to infinity, and δ=0 for each mid-point between these infinity-points, where the aliased period is a minimum. Thus, another way of stating the criteria that it is best to avoid Moiré fringes with a low Moiré frequency, as discussed above for the results of FIGS. 15A and 15B, is that δ should be closer to 0 than it is to 0.5, or equivalently δ≦0.25. Yet another way of stating this criteria of avoiding Moiré fringes with a low Moiré frequency is that $P_p/P_f$ has a value closer to the mid-point between consecutive integers than to either one of the consecutive integers.

Figure 18:
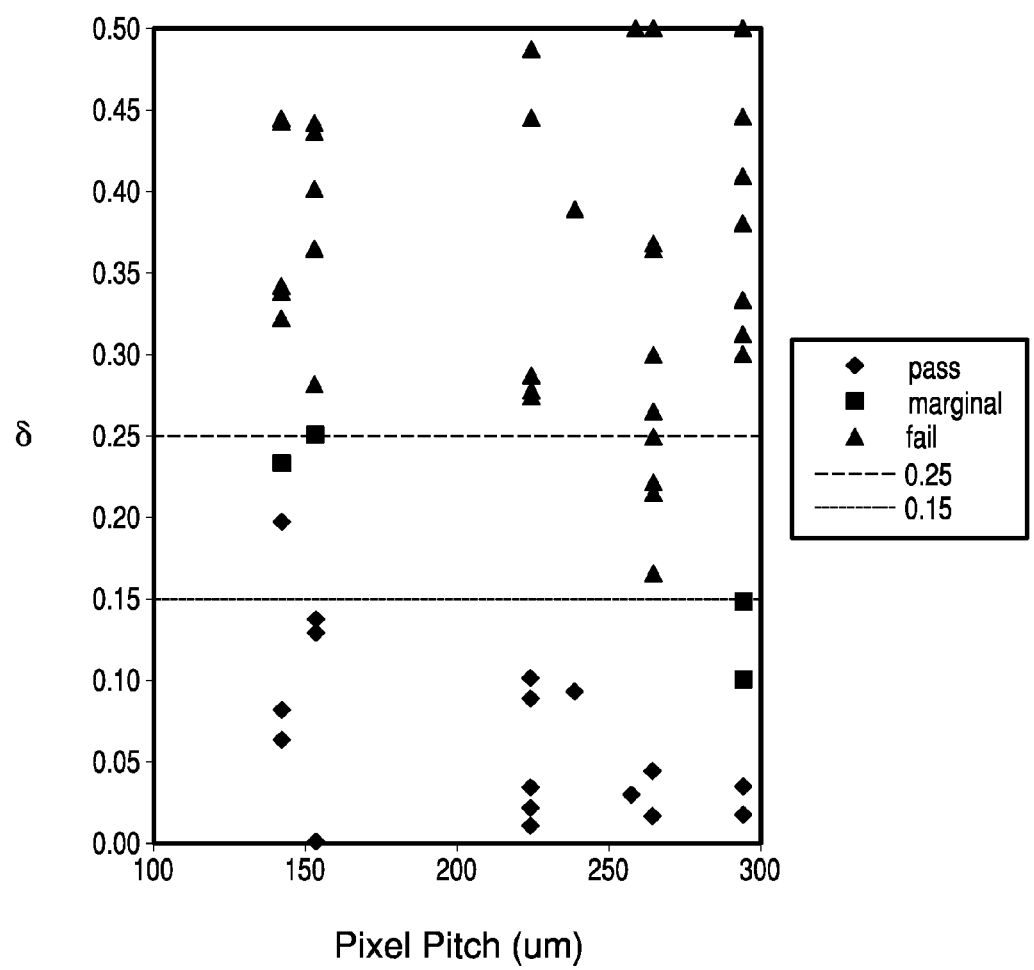
FIG. 18 is a graph illustrating data regarding the visibility of Moiré fringes for various values of the parameter δ and pixel pitch for a LCD/prism film structure.

FIG. 18 shows data from Table I for 6 different LCD panels with pixel pitches from 142-294 microns, combined with 11 different prism films with pitches ranging from 30-50 microns. A standard direct-lit backlight module with a standard 2 mm thick diffuser plate was used as a light source for the data in FIG. 18. The prism film was placed directly on top of the diffuser plate, and the LC panel was placed directly on top of the prism films. There were no other diffuser films in the stack, there was no air gaps between components. The LC pixels and prisms were aligned, which gives the worst possible conditions for Moiré visibility. Visual observations of Moiré fringes were made and the prism/pixel combination was rated "pass" if there were no visible fringes, "marginal" if fringes were visible but could be hidden by a typical top diffuser film, and "fail" if fringes were still visible even with a top diffuser. For δ greater than about 0.25 significant Moiré fringes were always seen, while for δ less than about 0.15 no visible moiré fringes were seen.

TABLE 1

Visual observation of Moiré fringes for LCD/prism film structures

| Pixel Pitch (micron) | Prism Pitch (micron) | δ | Moire |
|---|---|---|---|
| 142 | 30 | 0.23 | marginal |
| 142 | 31 | 0.08 | pass |
| 142 | 32 | 0.06 | pass |
| 142 | 33 | 0.20 | pass |
| 142 | 34 | 0.32 | fail |
| 142 | 35 | 0.44 | fail |
| 142 | 36 | 0.44 | fail |
| 142 | 37 | 0.34 | fail |
| 142 | 50 | 0.34 | fail |
| 153 | 30 | 0.40 | fail |
| 153 | 31 | 0.44 | fail |
| 153 | 32 | 0.28 | fail |
| 153 | 33 | 0.14 | pass |
| 153 | 34 | 0.00 | pass |
| 153 | 35 | 0.13 | pass |
| 153 | 36 | 0.25 | marginal |
| 153 | 37 | 0.36 | fail |
| 153 | 50 | 0.44 | fail |
| 224 | 30 | 0.03 | pass |
| 224 | 31 | 0.27 | fail |
| 224 | 32 | 0.50 | fail |
| 224 | 33 | 0.29 | fail |
| 224 | 34 | 0.09 | pass |
| 224 | 34.4 | 0.01 | pass |
| 224 | 35 | 0.10 | pass |
| 224 | 36 | 0.28 | fail |
| 224 | 37 | 0.45 | fail |
| 224 | 50 | 0.02 | pass |
| 237 | 34.4 | 0.39 | fail |
| 237 | 37 | 0.09 | pass |
| 259 | 34.4 | 0.03 | pass |
| 259 | 37 | 0.50 | fail |
| 264 | 30 | 0.30 | fail |
| 264 | 31 | 0.02 | pass |
| 264 | 32 | 0.25 | fail |
| 264 | 33 | 0.50 | fail |
| 264 | 34 | 0.26 | fail |
| 264 | 35 | 0.04 | pass |
| 264 | 36 | 0.17 | fail |
| 264 | 37 | 0.36 | fail |
| 264 | 42 | 0.21 | fail |
| 264 | 45 | 0.37 | fail |
| 264 | 50 | 0.22 | fail |
| 294 | 30 | 0.30 | fail |
| 294 | 31 | 0.02 | pass |
| 294 | 32 | 0.31 | fail |
| 294 | 33 | 0.41 | fail |
| 294 | 34 | 0.15 | marginal |
| 294 | 35 | 0.10 | marginal |
| 294 | 36 | 0.33 | fail |
| 294 | 37 | 0.45 | fail |
| 294 | 42 | 0.50 | fail |
| 294 | 45 | 0.03 | pass |
| 294 | 50 | 0.38 | fail |

While the embodiments above illustrate the effects due to the interaction of a prismatic film with prism pitch, $P_f$, and an optical display with pixel pitch, $P_p$, as a first microstructured component and a second microstructured component, respectively, in general the present inventions is not limited to a display system with a prismatic film with prism pitch, $P_f$, as the first microstructured optical component and an optical display with pixel pitch, $P_p$ as the second microstructured optical component. A more general equation to that above for the interaction of first microstructured component and a second microstructured component is provided by $P_2/P_1=m+½±δ$, where m is an integer and $0≦δ≦0.5$, where $P_1$ is the nominal first microstructure pitch and $P_2$ is the nominal second microstructure pitch, and by this definition $P_2 > P_1$.

The invention relates to the interaction of a first microstructured component and a second microstructured component more generally, where the first microstructured optical component has a plurality of first microstructures, and has a nominal first microstructure pitch, $P_1$, and the second microstructure optical component, which is arranged relative to the first microstructured optical component, where the second microstructure optical component has a plurality of second microstructures and having a second nominal microstructure pitch, $P_2$. Both the structures of the first microstructured optical component and the second microstructured optical component are periodic, and the pitches $P_2$ and $P_1$ are measured in directions that are at least approximately parallel, such that Moiré interaction may potentially occur. That is, if the directions of the pitches of the two microstructured optical components are perpendicular, there is no Moiré interaction between the components.

In general, each microstructured optical component may have periodicity in one or more directions, and thus have pitches in more than one direction. For example, the displays with pixels and prismatic films shown above have periodicities in two and one directions, respectively. Examples of the first and/or second microstructured optical components may be displays with pixels, prismatic films with prism structures, lenticular films with lenticular microstructures, or microlens films with micro lens structures.

Figure 19:
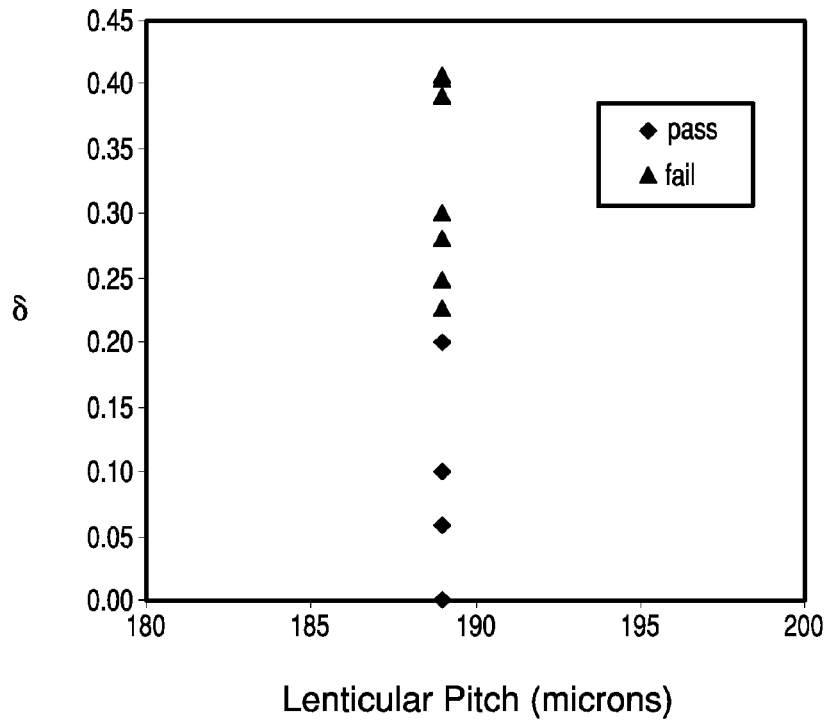
FIG. 19 is a graph illustrating data regarding the visibility of Moiré fringes for various values of the parameter δ for a lenticular film/prism film structure.

FIG. 19 shows interaction between a periodic lenticular microstructured optical component and various periodic prismatic microstructured optical components, where the parameters for the components are provided in Table 2. The pitch of the lenticular microstructures was oriented parallel to that of the prismatic microstructures. The relationship $P_2/P_1 = m + \frac{1}{2} \pm \delta$, applies where $P_2$ and $P_1$ are the pitches for the lenticular and prism structures, respectively, where m is an integer, $0 \leq \delta \leq 0.5$, and it is desirable to have $\delta \leq 0.25$, and even more desirable for $\delta \geq 0.15$.

TABLE 2

Visual observation of Moiré fringes for lenticular film/prism film structures

| Lenticular Pitch (micron) | Prism Pitch (micron) | δ | Moire |
|---|---|---|---|
| 189 | 30 | 0.20 | pass |
| 189 | 31 | 0.40 | fail |
| 189 | 32 | 0.41 | fail |
| 189 | 33 | 0.23 | fail |
| 189 | 34 | 0.06 | pass |
| 189 | 35 | 0.10 | pass |
| 189 | 36 | 0.25 | fail |
| 189 | 37 | 0.39 | fail |
| 189 | 42 | 0.00 | pass |
| 189 | 45 | 0.30 | fail |
| 189 | 50 | 0.28 | fail |

Figure 20:
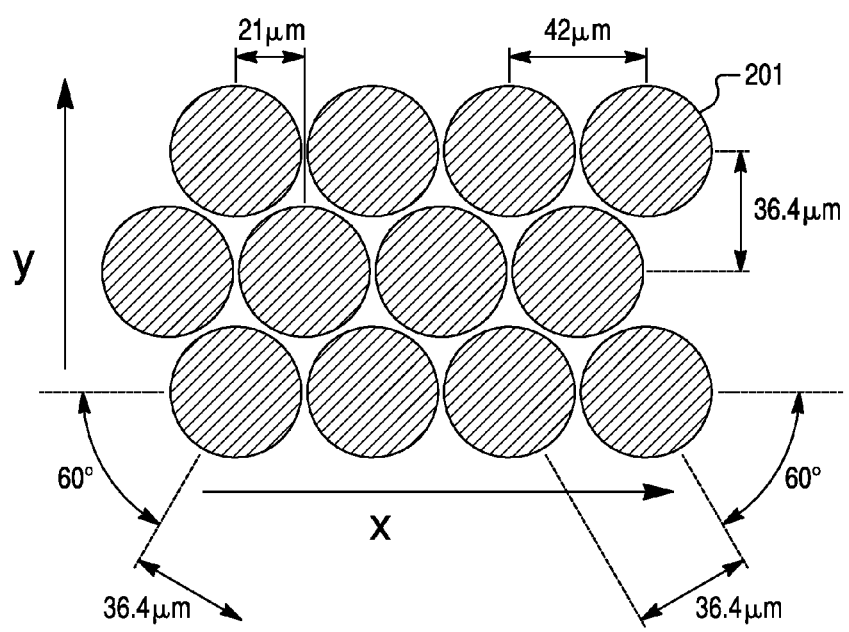
FIG. 20 is a schematic illustrating a microlens film.
Figure 21:
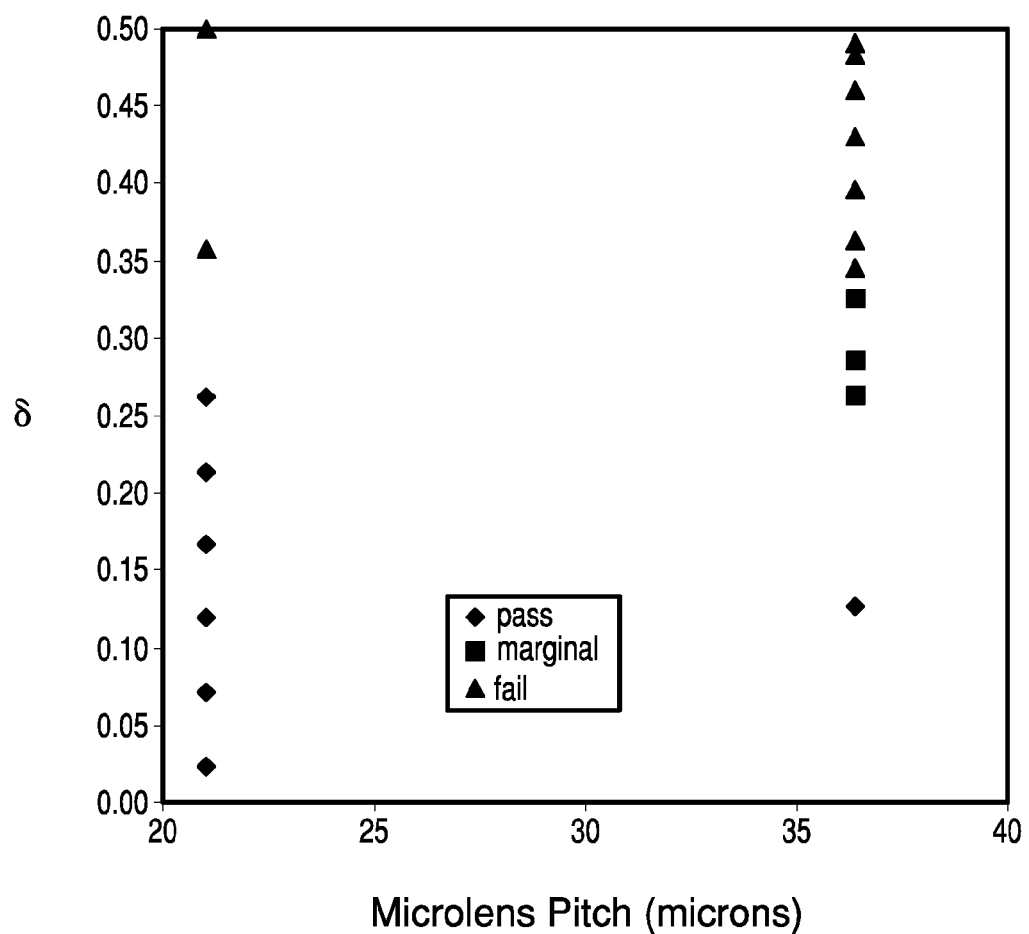
FIG. 21 is a graph illustrating data regarding the visibility of Moiré fringes for various values of the parameter δ and microlens pitch for a microlens film/prism film structure.

A typical microlens array is depicted in FIG. 20, with a plurality of microlens 201, while FIG. 21 shows interaction between the periodic microlens microstructured optical component of FIG. 20 and various periodic prismatic microstructured optical component. Table 3 shows the parameters of the structures used for the results in FIG. 21. In this case the hexagonal packing of the microlenses gives different periodicities in the x and y directions, and thus different Moiré when the prisms pitches are aligned with the microlens pitches in each direction. When the prisms run parallel to the x-axis, or plus-or-minus 60 degrees to the x-axis, the effective microlens pitch is 36.4 microns. When the prisms run parallel to the y-axis, the effective microlens pitch is 21 microns. The relationship $P_2/P_1 = m + \frac{1}{2} \pm \delta$, still applies where $P_2$ is the pitch of the larger of the effective microlens pitch for the microlens and the pitch of prism structures, and $P_1$ is the pitch of the smaller of the effective microlens pitch for the microlens and the pitch of prism structures, where m is an integer, $0 \leq \delta \leq 0.5$. Here it is desirable to have $\delta < 0.3$. This also illustrates that the pitch should be measured in the direction corresponding to the alignment of the periodic structures to each other.

TABLE 3

Visual observation of Moiré fringes for microlens film/prism film structures

| Microlens Pitch (micron) | Prism Pitch (micron) | δ | Moire |
|---|---|---|---|
| 36.4 | 30 | 0.29 | pass |
| 36.4 | 31 | 0.33 | marginal |
| 36.4 | 32 | 0.36 | marginal |
| 36.4 | 33 | 0.40 | fail |
| 36.4 | 34 | 0.43 | fail |
| 36.4 | 35 | 0.46 | fail |
| 36.4 | 36 | 0.49 | fail |
| 36.4 | 37 | 0.48 | fail |
| 36.4 | 42 | 0.35 | fail |
| 36.4 | 45 | 0.26 | fail |
| 36.4 | 50 | 0.13 | marginal |
| 21 | 30 | 0.07 | pass |
| 21 | 31 | 0.02 | pass |
| 21 | 32 | 0.02 | pass |
| 21 | 33 | 0.07 | pass |
| 21 | 34 | 0.12 | pass |
| 21 | 35 | 0.17 | pass |
| 21 | 36 | 0.21 | pass |
| 21 | 37 | 0.26 | pass |
| 21 | 42 | 0.50 | fail |
| 21 | 45 | 0.36 | fail |
| 21 | 50 | 0.12 | pass |

It should be noted that the more generalized formula for the Moiré frequencies $F_m$, also applies, where $F_m = m/P_2 - 1/P_1$, where m is an integer, and characterized by Moiré periods $P_m$, where $P_m = |1/F_m|$, and the optical display system preferably has a Moiré period of less than 1.6 mm for the lowest Moiré frequency.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An optical display system comprising:
   an optical light source;
   a first microstructured optical component having a plurality of first microstructures, and having a nominal first microstructure pitch, $P_1$; and
   a second microstructure optical component, arranged relative to the first microstructured optical component, having a plurality of second microstructures and having a second nominal microstructure pitch, $P_2$, wherein $P_2/P_1$ has a value closer to the mid-point between consecutive integers than to either one of the consecutive integers, wherein $P_2/P_1=m+\frac{1}{2}\pm\delta$, where m is an integer and $\delta \leq 0.25$, wherein the structure of the microstructures of the first microstructured optical component is randomly modulated.

2. The optical display system of claim 1, where $\delta \leq 0.15$.

3. The optical display system of claim 1, where the optical display is a liquid crystal display (LCD) display.

4. The optical display system of claim 1, wherein the second microstructure pitch $P_1$ is between 50 μm and 700 μm.

5. An optical display system comprising:
   an optical light source;
   a microstructured optical component having a plurality of microstructures, and having a nominal microstructure pitch, $P_f$; and
   an optical display arranged relative to the microstructured optical component and having a plurality of pixels having a pixel pitch, $P_p$, wherein $P_p/P_f$ has a value closer to the mid-point between consecutive integers than to either one of the consecutive integers,
   wherein $P_p/P_f=m+\frac{1}{2}\pm\delta$, where m is an integer and $\delta \leq 0.25$, wherein the structure of the microstructures of the microstructured optical component is randomly modulated.

6. The optical display system of claim 5, where $\delta \leq 0.15$.

7. The optical display system of claim 5, where the optical display is a liquid crystal display (LCD) display.

8. The optical display system of claim 5, wherein the pixel pitch $P_p$ is between 50 μm and 700 μm.

9. An optical display system comprising:
   an optical light source;
   a microstructured optical component having a plurality of microstructures, and having a nominal microstructure pitch, $P_f$; and
   an optical display arranged relative to the microstructured optical component and having a plurality of pixels having a pixel pitch, $P_p$, wherein $P_p/P_f$ has a value closer to the mid-point between consecutive integers than to either one of the consecutive integers,
   wherein $P_p/P_f=m+\frac{1}{2}\pm\delta$, where m is an integer and $\delta \leq 0.25$
   wherein microstructured optical component comprises at least one prismatic film, and the plurality of microstructures comprise prisms.

10. An optical display system comprising:
    an optical light source;
    a first microstructured optical component having a plurality of microstructures, and having a nominal first microstructure pitch, $P_1$; and
    a second microstructure optical component, arranged relative to the first microstructured optical component, having a plurality of second microstructures and having a second nominal microstructure pitch, $P_2$, wherein the Moiré pattern produced by the display due to interaction of light directed by the first microstructured optical component from the light source is characterized by Moiré frequencies $F_m$, where $F_m=m/P_2-1/P_1$, where m is an integer, and characterized by Moiré periods $P_m$, where $P_m=|1/F_m|$, the optical display system having a Moiré period of less than 1.6 mm for the lowest Moiré frequency, wherein the structure of the microstructures of the first microstructured optical component is randomly modulated.

11. The optical display system of claim 10, where the optical display system having a Moiré period of less than 0.5 mm for the lowest Moiré frequency.

12. The optical display system of claim 11, where the optical display is a liquid crystal display (LCD) display.

13. The optical display system of claim 10, wherein the first microstructure pitch $P_p$ is between 1 μm and 200 μm.

14. The optical display system of claim 10, wherein the second microstructure pitch $P_p$ is between 50 μm and 700 μm.

15. An optical display system comprising:
    an optical light source;
    a microstructured optical component having a plurality of microstructures, and having a nominal microstructure pitch, $P_f$; and
    an optical display arranged relative to the microstructured optical component and having a plurality of pixels having a pixel pitch, $P_p$, wherein the Moiré pattern produced by the display due to interaction of light directed by the microstructured optical component from the light source is characterized by Moiré frequencies $F_m$, where $F_m=m/P_p-1/P_f$, where m is an integer, and characterized by Moiré periods $P_m$, where $P_m=|1/F_m|$, the optical display system having a Moiré period of less than 1.6 mm for the lowest Moiré frequency, wherein the structure of the microstructures of the microstructured optical component is randomly modulated.

16. The optical display system of claim 15, where the optical display system having a Moiré period of less than 0.5 mm for the lowest Moiré frequency.

17. The optical display system of claim 15, where the optical display is a liquid crystal display (LCD) display.

18. The optical display system of claim 15, wherein the microstructure pitch $P_f$ is between 1 μm and 200 μm.

19. The optical display system of claim 15, wherein the pixel pitch $P_p$ is between 50 μm and 700 μm.

* * * * *